E. A. WHEELER.
VELOCIPEDE.

No. 177,774. Patented May 23, 1876.

WITNESSES:
Francis McArdle,
John Goethals

INVENTOR:
E. A. Wheeler
BY
ATTORNEYS.

UNITED STATES PATENT OFFICE.

EARL A. WHEELER, OF SHARON, PENNSYLVANIA.

IMPROVEMENT IN VELOCIPEDES.

Specification forming part of Letters Patent No. 177,774, dated May 23, 1876; application filed January 3, 1876.

*To all whom it may concern:*

Be it known that I, EARL A. WHEELER, of Sharon, in the county of Mercer and State of Pennsylvania, have invented a new and Improved Velocipede, of which the following is a specification:

The invention consists in driving the large wheels of a three-wheeled velocipede by means of treadle mechanism that turns the axle, while end ratchets of the latter carry pawls on the wheels, and rotate the same in a forward direction.

Figure 1:
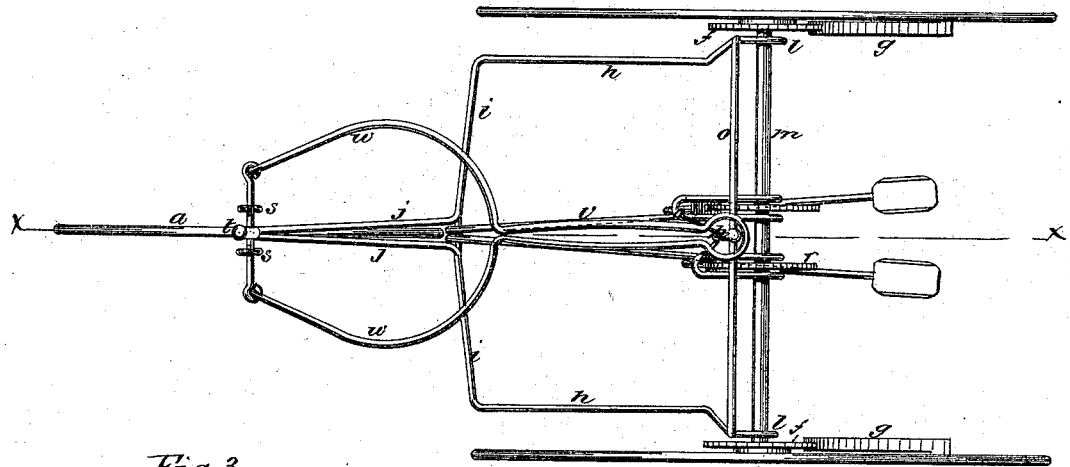
Figure 3:
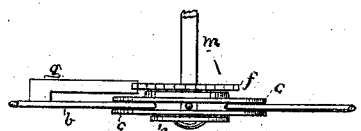
Figure 2:
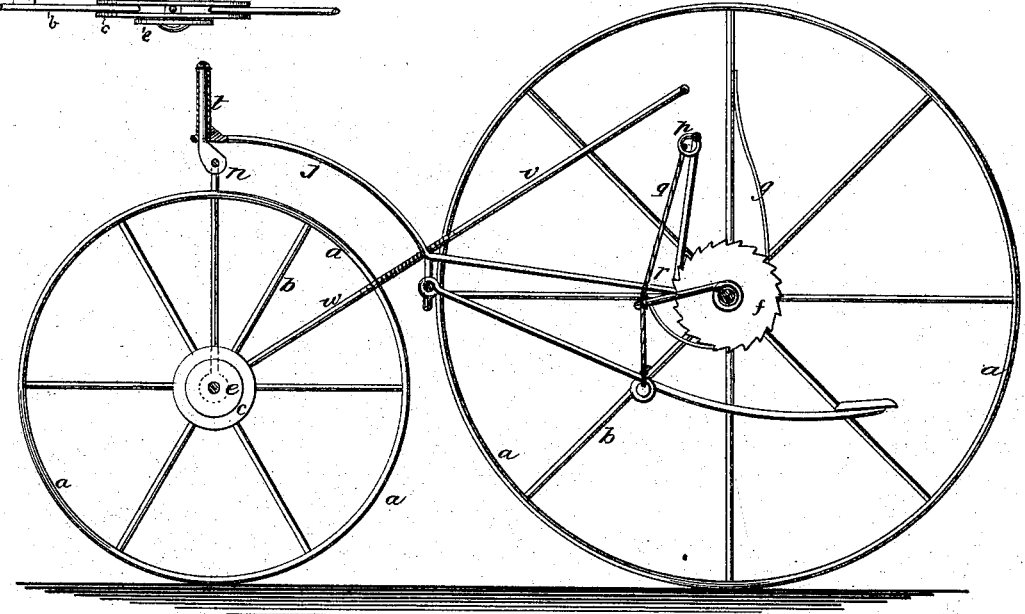

Figure 1 is a plan view of my improved velocipede. Fig. 2 is a longitudinal section, taken on line $x\ x$ of Fig. 1. Fig. 3 is a detail view, illustrating the construction of the wheel and the disks for holding the same on the axle.

Similar letters of reference indicate corresponding parts.

The wheel-rims $a$ and spokes $b$ are made of small round metal, and are soldered or brazed together, and the hubs consist of two disks, $C$, of light thin sheet metal soldered to the spokes. The hubs of the hind wheels are secured on the axle between two disks, $e$ and $f$, which are soldered to the axle, and the inner ones form ratchets with which the wheels, which turn loosely on the axle, are connected by spring-pawls $g$ to allow the necessary variable motion of the wheels for turning curves. The front wheel is similarly secured by two disks, $e$. The frame is made of a metal rod, bent in the fork shape represented by the parts $h$, $i$, and $j$, the parts $h$ having an eye, $l$, in the end for connecting the axle $m$, and the part $j$ being the portion which springs up to the beam $n$ over the top of the front wheel. An upright bearer, O, consisting of a metal rod bent in suitable form to rest on parts $h$ of the frame next to the axle, and soldered to said parts, supports a pulley, $p$, over which the treadle and pawl suspending-cord $r$ works. The front bearer consists of a doubled wire springing over the wheel and connected to the axle by eyes $s$ in the lower end, and a single rod attached to the top of the bow for the pivot of the socket $t$ of the frame to turn on. The guiding-lever is a metal rod, bent in fork shape, of which the doubled part $u$ forms the handle and the parts $w$ the bow stretching around the wheel to the axle and connected to it, the connection being by eyes in the ends linked with corresponding eyes in the axle.

I propose in practice to suspend the treadles and pawls by spiral springs instead of the cord and pulley, so that one treadle can be worked without the other, and in that case will have a foot-rest attached for the foot not working.

The operation is as follows: The treadles serve to operate the middle ratchets alternately, and these carry the axle. The latter has the end ratchets $ff$ to catch in the wheel-pawls $g\ g$ and carry said wheels around.

Having thus described my invention, I claim as new and desire to secure by Letters Patent—

The combination with an axle, $m$, having median treadle-operated ratchets, of the fast ratchets on ends, and the pawls attached to the loose ground-wheels, as and for the purpose specified.

EARL A. WHEELER.

Witnesses:
JOHN A. PORTER,
CALVIN THOMPSON.